United States Patent [19]

Senatore et al.

[11] Patent Number: 4,882,418
[45] Date of Patent: Nov. 21, 1989

[54] WASHING ARYLENE SULFIDE POLYMERS WITH WATER PLUS A REDUCING AGENT

[75] Inventors: Guy Senatore, Borger, Tex.; Afif M. Nesheiwat; Fred T. Sherk, both of Bartlesville, Okla.

[73] Assignee: Phillips Petroleum Company, Bartlesville, Okla.

[21] Appl. No.: 284,169

[22] Filed: Dec. 13, 1988

[51] Int. Cl.$^4$ .............................................. C08G 75/16
[52] U.S. Cl. ..................................... 528/499; 528/388; 528/480; 528/481; 528/487; 528/488; 528/490; 528/492
[58] Field of Search ............... 528/499, 487, 481, 492, 528/488, 480, 490, 388

[56] References Cited
U.S. PATENT DOCUMENTS

| | | | |
|---|---|---|---|
| 3,408,342 | 10/1968 | Horvath et al. | 260/45.9 |
| 3,839,302 | 10/1974 | Miles | 260/79 |
| 4,728,723 | 3/1988 | Nakamura et al. | 528/487 |
| 4,748,231 | 5/1988 | Neisheiwat | 528/499 |
| 4,801,664 | 1/1989 | Neisheiwat et al. | 528/487 |
| 4,814,430 | 3/1989 | Iwasaki et al. | 528/499 |

OTHER PUBLICATIONS

N. Nordell, *Water Treatment for Industrial and Other Uses*, 104 and 262 (1961).

*Betz Handbook of Industrial Water Conditioning*, 86 and 88 (7th ed., 1976).

G. Nickless, *Inorganic Sulfur Chemistry*, 519 and 521 (1968).

*Primary Examiner*—Harold D. Anderson
*Attorney, Agent, or Firm*—Richmond, Phillips, Hitchcock & Umphlett

[57] ABSTRACT

A process is provided for removing solid and liquid impurities from a particulate arylene sulfide polymer recovered from a polymerization reaction mixture slurry, without significantly discoloring the resulting washed polymer. The process of this invention comprises the steps of: (a) preparing a first slurry, wherein the solid component thereof comprises a particulate arylene sulfide polymer recovered from a reaction mixture slurry, and wherein the liquid component thereof comprises a mixture of water and a reducing agent; (b) heating the first slurry to a temperature of at least about 185° C. (365° F.) but below the melting point of the particulate polymer, to wash the polymer contained therein; (c) cooling the first slurry to a temperature below about 100° C. (212° F.), to form a second slurry, wherein the solid component thereof comprises a washed particulate arylene sulfide polymer; and (d) recovering the washed particulate arylene sulfide polymer from the second slurry.

36 Claims, No Drawings

WASHING ARYLENE SULFIDE POLYMERS WITH WATER PLUS A REDUCING AGENT

FIELD OF THE INVENTION

This invention relates to the production of arylene sulfide polymers. In one aspect of the invention, it relates to the improvement of color and other properties of arylene sulfide polymers.

BACKGROUND OF THE INVENTION

A basic process for the production of particulate arylene sulfide polymers from polyhalo-substituted aromatic compounds, wherein the halogen atoms attached to ring carbons react with a sulfur source while in the presence of an organic amide at an elevated temperature, is generally known in the art. Due to a continually growing attractiveness toward thermoplastic polymers, a great amount of work has been completed which has resulted in the disclosure of methods for both batch and continuous operations to produce particulate arylene sulfide polymers from polyhaloaromatic compounds having at least two halogens constituents per molecule.

One problem often associated with arylene sulfide polymers is their tendency to discolor when subjected to certain conditions. Specifically, arylene sulfide polymers which have not been subjected to elevated temperatures (i.e., at least about 100° C.), and/or which are not in the presence of materials which are capable of imparting color to the polymers, are generally substantially white in color. However, during high temperature recovery, treatment and/or processing procedures, these arylene sulfide polymers often undergo considerable darkening.

Most of the polymerization processes for producing particulate arylene sulfide polymers result in the polymer being present in a reaction mixture slurry, wherein the solid component thereof comprises a mixture of a particulate arylene sulfide polymer and particulate salt by-product materials, and wherein the liquid component thereof comprises a mixture of water, an organic amide, unreacted monomer and other liquid by-product materials. In order for the resulting arylene sulfide polymer to be useful in commercial applications, it must first be separated from the undesired solid and liquid components from the reaction mixture slurry.

Upon recovering the arylene sulfide polymer from the reaction mixture slurry, traces of the particulate salt by-product, the organic amide, the unreacted monomer, water and the other liquid by-product materials are generally recovered therewith. The concentration of these trace impurities present in or on the recovered arylene sulfide polymer reduce the purity and, thus, the quality of the polymer.

The amount of impurities present in or on the particulate arylene sulfide polymer can be determined by a number of techniques known by those skilled in the art. A common method often employed is burning the particulate arylene sulfide polymer until only ashes remain. The amount of ashes which remain are indicative of the amount of impurities in or on the polymer. Since it is commercially desirable to reduce the degree of impurities in or on a particulate arylene sulfide polymer, this can be viewed as a desirability to reduce the ash content of a burned polymer sample.

One method of separating the particulate arylene sulfide polymer from the undesired impurities therein and/or thereon is generally accomplished through a number of high temperature washing procedures. Each such washing procedure is generally performed in a closed vessel and comprises slurrying the particulate polymer recovered from the polymerization reaction mixture slurry with a liquid medium (e.g., water). The slurry is agitated while the temperature and pressure within the closed vessel is elevated (e.g., at least about 100° C. (212° F.) but below the melting point of the polymer and at least about 100 psig). This heated slurry is then cooled; and, thereafter, the washed particulate arylene sulfide polymer separated therefrom.

Although such washing procedures do result in removing a substantial amount of solid and liquid impurities from the particulate polymer recovered from a reaction mixture slurry, there are, however, disadvantages associated therewith. The most prominent disadvantage is that the resulting particulate arylene sulfide polymer is often discolored when compared to the color of the polymer prior to the high temperature washing process. Specifically, as stated earlier, particulate arylene sulfide polymers, as recovered from a polymerization reaction mixture slurry, are generally substantially white in color. However, after such a high temperature water-wash procedure, as described above, the color of the resulting polymers generally ranges from tan to dark brown.

In many commercial applications, it is highly desirable to separate the particulate arylene sulfide polymer from the undesired solid and liquid materials contained in the reaction mixture slurry. However, equally as desirable is to prepare and/or employ, in downstream processing, particulate arylene sulfide polymers which are substantially white in color and/or have not been subjected to a significant degree of discoloration. Therefore, one object of this invention is to provide a process which results in a recovered particulate arylene sulfide polymer of reduced impurity concentration and reduced degree of discoloration.

Other aspects, concepts and objects of this invention will become apparent from the following Detailed Description when considered with the appended claims.

STATEMENT OF THE INVENTION

The invention is a process to provide a washed particulate arylene sulfide polymer having associated therewith a reduced impurity concentration and a reduced degree of discoloration.

In accordance with this invention, liquid and solid impurities are removed from a particulate arylene sulfide polymer recovered from a reaction mixture slurry, wherein the liquid component thereof comprises water, an organic amide, unreacted monomer and various liquid by-product materials. The novel process of this invention comprises the steps of: (a) preparing a first slurry, wherein the solid component thereof comprises a particulate arylene sulfide polymer recovered from a polymerization reaction mixture slurry, and wherein the liquid component thereof comprises a mixture of water and a reducing agent; (b) heating the first slurry to a temperature of at least about 185° C. (365° F.) but below the melting point of the particulate arylene sulfide polymer, to wash the polymer contained therein; (c) cooling the first slurry to a temperature below about 100° C. (212° F.), to form a second slurry, wherein the solid component thereof comprises a washed particulate arylene sulfide polymer; and (d) recovering the washed particulate arylene sulfide polymer from the second slurry.

After the novel washing process of this invention, the recovered, washed, particulate arylene sulfide polymer (1) is substantially the same color as the particulate polymer prior to the washing process and (2) has associated therewith a substantially lower impurity concentration than the particulate polymer prior to the washing process.

DETAILED DESCRIPTION OF THE INVENTION

This invention is useful with particulate arylene sulfide polymers regardless of their method of preparation. Generally, the arylene sulfide polymers which are most apt to be washed in accordance with the process of this invention are phenylene sulfide polymers. Specifically, the process of this invention can be employed to remove undesired solid and liquid impurities from particulate arylene sulfide polymers, after being recovered from a reaction mixture slurry, by washing the polymers at an elevated temperature in an aqueous medium comprising a reducing agent without significantly discoloring the resulting washed polymer.

In general, the arylene sulfide polymers washed by the process of this invention can be produced by contacting, under polymerization conditions, reactants comprising a polyhaloaromatic compound, a sulfur source and an organic amide. Optionally, components such as polyhaloaromatic compounds, having more than two halogen substituents per molecule, and/or polymerization modifying compounds (e.g., alkali metal carboxylates and/or lithium halides) can also be added before and/or during the polymerization process.

Examples of arylene sulfide polymers which can be washed in accordance with the process of this invention include, but are not limited to, poly(arylene sulfides), poly(arylene sulfide ketones), poly(arylene sulfide diketones), and poly(arylene sulfide sulfones). The "arylene" group of the above examples of arylene sulfide polymers is preferably a phenylene group.

Although other polymers are not excluded, in general, the arylene sulfide polymers, most apt to be washed in accordance with the process of this invention, can be represented by having as the repeating unit:

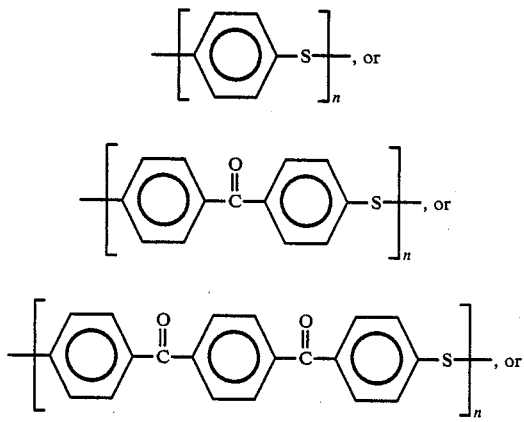

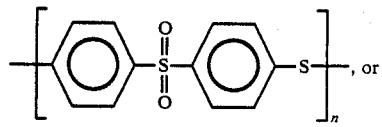

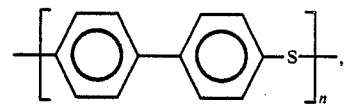

wherein n is the number of repeating units in the polymer.

The invention comprises a process which provides a washed particulate arylene sulfide polymer having associated therewith a reduced impurity concentration and a color which is not significantly different from that of its respective unwashed counterpart.

In accordance with this invention, a novel process is provided for removing liquid and solid impurities from a particulate arylene sulfide polymer which has been recovered from a polymerization reaction mixture slurry, wherein the liquid component thereof comprises water, an organic amide, unreacted monomer and various liquid by-product materials. The novel process of this invention comprises the steps of: (a) preparing a first slurry, wherein the solid component thereof comprises a particulate arylene sulfide polymer recovered from a polymerization reaction mixture slurry, and wherein the liquid component thereof comprises a mixture of water and a reducing agent; (b) heating the first slurry to a temperature of at least about 185° C. (365° F.) but below the melting point of the particulate arylene sulfide polymer, to wash the polymer contained therein; (c) cooling the first slurry to a temperature below about 100° C. (212° F.), to form a second slurry, wherein the solid component thereof comprises a washed particulate arylene sulfide polymer; and (d) recovering the washed particulate arylene sulfide polymer from the second slurry.

After the novel washing process of this invention, the recovered, washed particulate arylene sulfide polymer is substantially the same color as its respective unwashed counterpart and has associated therewith a substantially lower impurity concentration than its respective unwashed counterpart.

In a typical arylene sulfide polymerization reaction mixture slurry, the solid component thereof comprises a mixture of a particulate arylene sulfide polymer and solid salt by-product materials; and, the liquid component thereof comprises a mixture of water, an organic amide, unreacted monomer and various liquid by-product materials. When the particulate arylene sulfide polymer is recovered from this reaction mixture slurry, it is generally in the form of a wet filter cake comprising from about 10 to about 70 percent, by weight, of liquid impurities from the reaction mixture slurry and from about 90 percent to about 30 percent, by weight, of particulate polymeric material and solid salt by-products.

When practicing this invention, a first slurry is prepared, wherein the solid component thereof comprises a particulate arylene sulfide polymer recovered from a polymerization reaction mixture slurry, and wherein the liquid component thereof comprises a mixture of water and a reducing agent. Any suitable method can be employed to prepare this first slurry. One example of such a suitable method is one which takes a particulate arylene sulfide polymer, as recovered from a reaction mixture slurry in the form of a wet filter cake (i.e., approximately 50 weight percent polymer and salt and approximately 50 weight percent liquid component), and adds this wet, resin-containing filter cake to a liquid comprising a mixture of water and a reducing agent.

Another example of a suitable method which will produce an acceptable first slurry is one which takes the wet, resin-containing filter cake, as recovered from a reaction mixture slurry, and adds this to a liquid comprising water. Then, after slurrying the particulate polymer in the water, but prior to heating the slurry, a reducing agent is added thereto.

The reducing agent employed in this invention can be any suitable reducing agent which has the capability of reacting with molecular oxygen ($O_2$) at a temperature below about 185° C. (365° F.) to effectively remove substantially all traces of molecular oxygen from the washing solution. Examples of such suitable reducing agents include, but are not limited to, sodium dithionite, sodium sulfite, hydrazine, and mixtures thereof. The presently preferred reducing agent is sodium dithionite.

The amount of reducing agent employed in the process of this invention can vary depending upon the specific reducing agent employed, the washing temperature, the desired quantity of the water employed and the characteristics of the final washed polymer. Generally, the amount of reducing agent present in the first slurry will range from about 0.001 to about 10 weight percent, preferably from about 0.005 to about 5 weight percent, and more preferably, from about 0.01 to about 2 weight percent, wherein the weight percentages are based on the total weight of water present in the liquid component of the first slurry. If the particulate arylene sulfide polymer employed in preparing the first slurry is in the form of a wet filter cake, the amount of water present in the filter cake should be considered when determining the concentration of reducing agent to be added. As stated earlier, a wet filter cake generally comprises approximately 50 weight percent particulate polymer and salt and approximately 50 weight percent liquid component.

This liquid component comprises water, organic amide, unreacted monomer, and other various liquid by-product materials. Generally, the water present in the liquid component of the first slurry is proportional to the percentage of water present in the liquid component of the wet filter cake. This percentage is greatly dependent upon the particular polymerization process employed. Generally, the percentage of water ranges from about 5 weight percent up to about 75 weight percent.

After the first slurry is prepared, wherein the liquid component thereof comprises a mixture of water and a reducing agent, and wherein the solid component thereof comprises the particulate arylene sulfide polymer recovered from the reaction mixture slurry, the first slurry is heated to an elevated temperature which is below the melting point of the particulate arylene sulfide polymer contained therein but at least about 185° C. (365° F.). Generally, the first slurry is heated to a temperature which is at least about 185° C. (365° F.) but does not exceed 10° C. (18° F.) below the melting point of the polymer contained therein. Preferably, the first slurry is heated to a temperature which is at least about 185° C. (365° F.) but does not exceed 25° C. (45° F.) below the melting point of the polymer contained therein.

The melting point of the arylene sulfide polymer contained in the first slurry can be readily determined by one skilled in the art. Arylene sulfide polymers generally have melting points ranging from about 250° C. (482° F.) to about 500° C. (932° F.). Depending upon the specific arylene sulfide polymer contained in the first slurry, the general and preferrred temperature range to which this first slurry is heated during the inventive washing process will vary. For example, if the solid component of the first slurry comprises, as the first particulate arylene sulfide resin, poly(phenylene sulfide), which has a melting point of about 285° C. (545° F.) and, if the liquid component of the first slurry comprises, as the reducing agent, sodium dithionite, the temperature to which the first slurry is heated generally ranges from about 185° C. (365° F.) to about 275° C. (527° F.). Preferably, the temperature to which this first slurry is heated ranges from about 185° C. (365° F.) to about 260° C. (500° F.). On the other hand, if the solid component of the first slurry comprises, as the particulate arylene sulfide resin, poly(biphenylene sulfide), which has a melting point of about 445° C. (833° F.) and, if the liquid component of the first slurry comprises, as the reducing agent, sodium dithionite, the temperature to which the first slurry is heated generally ranges from about 185° C. (365° F.) to about 435° C. (815° F.). Preferably, the temperature to which this slurry is heated ranges from about 185° C. (365° F.) to about 420° C. (788° F.).

Another example of washing a particulate arylene sulfide resin in accordance with this invention to remove solid and liquid impurities therefrom is that wherein the particulate arylene sulfide resin contained in the first slurry is a poly(arylene sulfide ketone). Poly(arylene sulfide ketone) resins generally have melting points ranging from about 250° C. (482° F.) to about 500° C. (932° F.). Depending upon the specific poly(arylene sulfide ketone) resin contained in the first slurry, as the particulate arylene sulfide resin, the general and preferred temperature range to which the first slurry is heated during this inventive washing process will vary. For example, if the solid component of the first slurry comprises, as the particulate poly(arylene sulfide ketone), poly(phenylene sulfide ketone), which has a melting point of about 345° C. (653° F.) and, if the liquid component of the first slurry comprises, as the reducing agent, sodium dithionite, the temperature to which the first slurry is heated generally ranges from about 185° C. (365° F.) to about 335° C. (635° F.). Preferably, the temperature to which this slurry is heated ranges from about 185° C. (365° F.) to about 320° C. (608° F.).

Another example of washing a particulate arylene sulfide resin in accordance with this invention to remove solid and liquid impurities therefrom is that wherein the particulate arylene sulfide resin contained in the first slurry is a poly(arylene sulfide diketone). Poly(arylene sulfide diketone) resins generally have melting points ranging from about 275° C. (527° F.) to about 500° C. (932° F.). Depending upon the specific poly(arylene sulfide diketone) resin contained in the first slurry, as the particulate arylene sulfide resin, the general and preferred temperature range to which the first slurry is heated during this inventive washing process will vary. For example, if the solid component of the first slurry comprises, as the particulate poly(arylene sulfide diketone), poly(phenylene sulfide diketone), which has a melting point of about 402° C. (756° F.) and, if the liquid component of the slurry comprises, as the reducing agent, sodium dithionite, the temperature to which the slurry is heated generally ranges from about 185° C. (365° F.) to about 392° C. (738° F.). Preferably, the temperature to which this slurry is heated ranges from about 185° C. (365° F.) to about 377° C. (711° F.).

Another example of washing a particulate arylene sulfide resin in accordance with this invention to remove solid and liquid impurities therefrom is that wherein the arylene sulfide resin is a poly(arylene sulfide sulfone). Poly(arylene sulfide sulfone) resins are amorphous materials and as such generally have glass transition temperatures ranging from about 200° C. (392° F.) to about 250° C. (482° F.). Depending upon the specific poly(arylene sulfide sulfone) resin contained in the first slurry, as the particulate arylene sulfide resin, the general and preferred temperature range to which the first slurry is heated during this inventive washing process will vary. For example, if the solid component of the first slurry comprises, as the particulate poly(arylene sulfide sulfone), poly(phenylene sulfide sulfone), which has a glass transition temperature of about 215° C. (419° F.) and, if the liquid component of the first slurry comprises, as the reducing agent, sodium dithionite, the temperature to which the first slurry is heated generally ranges from about 185° C. (365° F.) to about 205° C. (401° F.). Preferably, the temperature to which this slurry is heated ranges from about 185° C. (365° F.) to about 190° C. (374° F.).

The time for contacting the particulate arylene sulfide resin contained in the first slurry with the aqueous medium containing the reducing agent at the elevated temperature can vary widely, depending, in part, on the temperature to which the first slurry is heated, the nature of the particulate arylene sulfide polymer and/or the nature and concentration of the specific reducing agent employed. After the first slurry has been heated to the selected elevated temperature, the first slurry is maintained at this temperature for a time which is sufficient to wash at least some of the solid and liquid impurities from the particulate resin contained therein. Generally, this hold period ranges from about 5 seconds to about 8 hours, preferably, from about 10 seconds to about 4 hours.

The pressure during this hold period is autogenous. Generally, the autogenous pressure does not exceed the limits necessary to maintain the slurry conditions. The pressure during this process generally ranges from about 0 psig to about 1500 psig; preferably, from about 50 psig to about 500 psig.

After the first slurry is heated to the appropriate elevated temperature and held at that temperature for the appropriate period of time, the temperature of this first slurry is lowered to a temperature below about 100° C. (212° F.); preferably, below about 75° C. (167° F.). The rate at which the temperature of the heated first slurry is lowered is generally not critical. However, for practical purposes, the rate at which the temperature of the heated first slurry is reduced after the hold period is generally at least about 1° C. (2° F.)/minute. Preferably, this cooling of the heated first slurry is at a rate of at least about 10° C. (50° F.)/minute.

After the cooling of the heated first slurry to a temperature below about 100° C. (212° F.) a second slurry is formed wherein the liquid component thereof comprises a mixture of water, an organic amide, unreacted monomer and various liquid by-product materials, and wherein the solid component thereof comprises a washed particulate arylene sulfide polymer.

After the second slurry has been formed, the washed particulate arylene sulfide polymer can be separated therefrom by any suitable separation techniques known by those skilled in the art. Examples of suitable separation techniques include, but are not limited to, filtration, screening, centrifuging, decantation and mixtures thereof.

The recovered, washed, particulate arylene sulfide polymer has a substantially lower concentration of liquid and solid impurities therein and thereon than its respective unwashed counterpart. Moreover, the recovered, washed, particulate arylene sulfide polymer has substantially the same color of its respective unwashed counterpart.

Depending upon the specific parameters of the inventive washing process employed and the tolerance level of solid and liquid impurities in and/or on the recovered, washed polymer, subsequent inventive washing procedures can be employed.

After reducing the impurity concentration in and/or on the recovered, washed arylene sulfide resin, the resin can be subsequently dried and, optionally, cured. This dried arylene sulfide resin can then be employed in the preparation of a final or intermediate product by any method known by those skilled in the art.

EXAMPLES

The examples which follow are intended to assist in a further understanding of this invention. Particular materials employed, species, and conditions are intended to be illustrative of the invention and not limitative of the reasonable scope thereof.

EXAMPLE I

This example demonstrates a process for washing solid and liquid impurities from a particulate arylene sulfide polymer recovered from a polymerization reaction mixture slurry. The specific polymer used in this Example is poly(phenylene sulfide), henceforth PPS.

The PPS resin used in this example was prepared by charging a 100 gallon reactor with a mixture of 33.7 gallons of N-methyl-2-pyrrolidone (NMP), 73.2 lbs. of aqueous sodium hydroxide (50.1 weight percent sodium hydroxide), 86.7 lbs. of aqueous sodium hydrosulfide (59.77 weight percent sodium hydrosulfide), and 23.5 lbs. of sodium acetate. This mixture was heated from about 169° C. (337° F.) to 234° C. (453° F.) over a period of about 1.5 hours during which there was distilled away from the mixture 68.6 lbs. of overhead which was substantially water with some NMP also included. Following the dehydration step the reaction mixture was cooled to about 226° C. (438° F.) and a mixture of 134.66 lbs. of p-dichlorobenzene and 228.8 grams of 1,2,4-trichlorobenzene was added as a molten mixture followed by about 2 gallons of NMP to flush the charge lines. The reaction mixture was then heated at 232° C. (450° F.) for 2 hours and then at 265° C. (509° F.) for 3 hours. The reaction mixture was then quenched by the addition of 10 gallons of water and the mixture cooled to 79° C. (175° F.) over a period of about 1.75 hours. The reaction mixture was then diluted with an additional 50 gallons of water and filtered to recover 75 lbs. of unwashed PPS in the form of a wet filter cake (i.e., approximately 50 weight percent particulate PPS resin and approximately 50 weight percent liquid solution).

Samples of the PPS prepared above were washed according to the procedures described below.

In a control run (i.e., Run 1) 850 grams of the wet filter cake, prepared above, was slurried in a two gallon reactor with 3.5 liters of water. This slurry was heated, while stirring, to 185° C. (365° F.) and then cooled to room temperature. The PPS resin was then separated from this slurry by filtering. The filtered PPS resin was then permitted to dry. The color of the dried PPS resin, following this washing procedure, was observed and recorded in Table I.

In a run conducted in accordance with this invention (i.e., Run 2) 850 grams of the wet filter cake, prepared above, was slurried in a two gallon reactor by 3.5 liters of water, which had dissolved therein 7 grams of sodium dithionite (i.e., 0.2 weight percent sodium dithionite based on the weight of water added to the reactor). This slurry was heated, while stirring, to 185° C. (365° F.) and then cooled to room temperature. The PPS resin was separated from this slurry by filtration. The filtered PPS resin was then permitted to dry. The color of the dried PPS resin, washed in accordance with inventive Run 2, was observed and recorded in Table I.

In another inventive run (i.e., Run 3), 120 grams of the wet filter cake, prepared above, was slurried in a one liter reactor with 0.5 liters of water, which had dissolved therein 2 grams of sodium dithionite (0.4 weight percent sodium dithionite based upon the weight of water added to the reactor). This slurry was heated, while stirring, to 185° C. (365° F.) and cooled to room temperature. The PPS resin was then recovered from this slurry by filtration. The recovered PPS resin was then permitted to dry. The color of the dried PPS resin, washed in accordance with inventive Run 3, was observed and recorded in Table I.

TABLE I

Effect of a Reducing Agent Present in a High Temperature Washing Process

| Run No. | Polymeric Filter Cake (grams) | Water (grams) | Sodium Dithionite (grams) | Polymer Color[a] |
|---|---|---|---|---|
| 1 (Control) | 850 | 3500 | 0 | Brown |
| 2 (Invention) | 850 | 3500 | 7 | White |
| 3 (Invention) | 120 | 500 | 2 | White |

[a]Polymer color determined after washing procedure and after drying the resin sample.

As can be seen, the results obtained by washing the PPS resin in accordance with the inventive procedure recited herein (i.e., Runs 2 and 3) demonstrate that the presence of a reducing agent (e.g., sodium dithionite) in a hot aqueous-based washing solution, prevents the discoloration of the resulting washed PPS resin.

EXAMPLE II

This example demonstrates a process for washing solid and liquid impurities from a particulate arylene sulfide polymer recovered from a polymerization reaction mixture slurry. The specific polymer used in this Example is poly(phenylene sulfide), henceforth PPS.

The PPS resin employed in this example was prepared by a polymerization process substantially the same as that recited in Example I. This PPS resin (henceforth Resin 1) was washed according to the procedure described below. The wet filter cake containing Resin 1, was slurried with 50 gallons of deionized water at 54° C. (130° F.). This slurry was then filtered forming a second polymeric filter cake containing Resin 1.

This second filter cake was slurried with 120 gallons of deionized water at 17° C. (62° F.) and subsequently rinsed on a filter device with hot deionized water (180° F.) to form a third filter cake. This third filter cake was subjected to two consecutive hot washing procedures, each utilizing 80 gallons of an aqueous solution comprising deaerated, deionized water. After each hot washing procedure, the third filter cake was rinsed on the aforementioned filter device with cold deionized water.

In the first hot washing procedure, the aqueous solution was prepared by mixing 160 grams of sodium hydroxide in the water and heating the solution to 180° F. In the second hot washing procedure, the aqueous washing solution was prepared by mixing 316 grams of calcium acetate in the water and heating the solution to 180° F. The third filter cake, containing Resin 1, was then permitted to dry.

The ash content of dried Resin 1 was determined by placing approximately 5.00 grams of dried Resin 1 into a platinum evaporating dish. The polymer sample was then burned over an open flame until all burning ceased. The platinum dish, containing the burned polymer sample was then transferred to a muffle furnace set at 1000° F. The sample was left in the muffle furnace until all carbonaceous material was gone (i.e., approximately 5 hours). The evaporating dish was then removed from the furnace, cooled to room temperature, and weighed to determine the ash content of Resin 1. The resulting ash content of Resin 1, was 0.29 weight percent.

A second PPS resin (i.e., Resin 2) was prepared by a polymerization process substantially identical to that employed when preparing Resin 1. The wet filter cake containing Resin 2 was washed in accordance with the same procedure employed when washing the wet filter cake containing Resin 1 except for the following: (a) deaerated water was not employed, (b) in the first hot washing procedure, the aqueous solution was prepared by mixing 160 grams of sodium hydroxide and 870 grams of sodium dithionite (0.3 weight percent sodium dithionite based on the weight of added water) in the water, and (c) in the second hot washing procedure, the aqueous washing solution was prepared by mixing 316 grams of calcium acetate and 870 grams of sodium dithionite (0.3 weight percent of sodium dithionite based upon the weight of water added) in the water.

The ash content of washed and dried Resin 2 was determined in accordance with the same procedure employed for Resin 1. The resulting ash content of Resin 2 was 0.19 weight percent. The lower ash content of Resin 2 indicated a lower concentration of impurities present in or on the dried Resin after the inventive washing procedure was employed.

It is evident from the foregoing that various modifications can be made to the embodiments of this invention without departing from the spirit and scope thereof, which will be apparent to those skilled in the art. Having thus described the invention, it is claimed as follows.

That which is claimed is:

1. A process comprising the steps of:
   (a) preparing a first slurry, wherein the solid component of said first slurry comprises a particulate arylene sulfide polymer recovered from a polymerization reaction mixture slurry, and wherein the liquid component of said first slurry comprises water and a reducing agent;
(b) heating said first slurry to a temperature of at least about 185° C. but below the melting point of said particulate arylene sulfide polymer, to wash and said particulate arylene sulfide polymer;
(c) cooling said first slurry to a temperature below about 100° C. to form a second slurry, wherein the solid component of said second slurry comprises a washed particulate arylene sulfide polymer; and
(d) recovering said washed, particulate arylene sulfide polymer from said second slurry.

2. A process in accordance with claim 1 wherein said first slurry is prepared by slurrying said particulate arylene sulfide polymer in a liquid solution comprising water and a reducing agent.

3. A process in accordance with claim 2 wherein said particulate arylene sulfide polymer used in said preparation of said first slurry is in the form of a wet filter cake.

4. A process in accordance with claim 1 wherein said first slurry is prepared by slurrying said particulate arylene sulfide polymer in a liquid solution comprising water to form an intermediate slurry, and adding to said intermediate slurry a reducing agent.

5. A process in accordance with claim 4 wherein said particulate arylene sulfide polymer used in said preparation of said first slurry is in the form of a wet filter cake.

6. A process in accordance with claim 1 wherein said reducing agent comprises at least one composition selected from the group consisting of sodium dithionite, sodium sulfite, hydrazine, and mixtures thereof.

7. A process in accordance with claim 6 wherein said reducing agent comprises sodium dithionite.

8. A process in accordance with claim 1 wherein the amount of said reducing agent present in said first slurry, prior to step (b), ranges from about 0.001 to about 10 weight percent, said weight percentages are based on the total weight of said water present in said liquid component of said first slurry.

9. A process in accordance with claim 8 wherein the amount of said reducing agent present in said first slurry, prior to step (b), ranges from about 0.005 to about 5 weight percent, said weight percentages are based on the total weight of said water present in said liquid component of said first slurry.

10. A process in accordance with claim 9 wherein the amount of said reducing agent present in said first slurry, prior to step (b), ranges from about 0.01 to about 2 weight percent, said weight percentages are based on the total weight of said water present in said liquid component of said first slurry.

11. A process in accordance with claim 1 wherein after step (a), said first slurry is heated to a temperature which is at least about 185° C. but does not exceed about 10° C. below the melting point of said particulate arylene sulfide polymer.

12. A process in accordance with claim 11 wherein after step (a), said first slurry is heated to a temperature which is at least about 185° C. but does not exceed about 25° C. below the melting point of said particulate arylene sulfide polymer.

13. A process in accordance with claim 1 wherein said particulate arylene sulfide polymer used in said preparation of said first slurry comprises at least one polymer selected from the group consisting of poly(arylene sulfide), poly(arylene sulfide ketone), poly(arylene sulfide diketone) and poly(arylene sulfide sulfone).

14. A process in accordance with claim 13 wherein said particulate arylene sulfide polymer used in said preparation of said first slurry comprises at least one polymer selected from the group consisting of poly(phenylene sulfide), poly(biphenylene sulfide), poly(phenylene sulfide ketone), poly(phenylene sulfide diketone) and poly(phenylene sulfide sulfone).

15. A process in accordance with claim 13 wherein said particulate arylene sulfide polymer used in said preparation of said first slurry comprises poly(arylene sulfide).

16. A process in accordance with claim 15 wherein said poly(arylene sulfide) comprises poly(phenylene sulfide).

17. A process in accordance with claim 16 wherein after step (a), said first slurry is heated to a temperature ranging from about 185° C. to about 275° C.

18. A process in accordance with claim 17 wherein after step (a), said first slurry is heated to a temperature ranging from about 185° C. to about 260° C.

19. A process in accordance with claim 15 wherein said poly(arylene sulfide) comprises poly(biphenylene sulfide).

20. A process in accordance with claim 19 wherein after step (a), said first slurry is heated to a temperature ranging from about 185° C. to about 435° C.

21. A process in accordance with claim 20 wherein after step (a), said first slurry is heated to a temperature ranging from about 185° C. to about 420° C.

22. A process in accordance with claim 13 wherein said particulate arylene sulfide polymer used in said preparation of said first slurry comprises poly(arylene sulfide ketone).

23. A process in accordance with claim 22 wherein said poly(arylene sulfide ketone) comprises poly(phenylene sulfide ketone).

24. A process in accordance with claim 23 wherein after step (a), said first slurry is heated to a temperature ranging from about 185° C. to about 335° C.

25. A process in accordance with claim 24 wherein after step (a), said first slurry is heated to a temperature ranging from about 185° C. to about 320° C.

26. A process in accordance with claim 13 wherein said particulate arylene sulfide polymer used in said preparation of said first slurry comprises poly(arylene sulfide diketone).

27. A process in accordance with claim 26 wherein said poly(arylene sulfide diketone) comprises poly(phenylene sulfide diketone).

28. A process in accordance with claim 27 wherein after step (a), said first slurry is heated to a temperature ranging from about 185° C. to about 392° C.

29. A process in accordance with claim 28 wherein after step (a), said first slurry is heated to a temperature ranging from about 185° C. to about 377° C.

30. A process in accordance with claim 13 wherein said particulate arylene sulfide polymer used in said preparation of said first slurry comprises poly(arylene sulfide sulfone).

31. A process in accordance with claim 30 wherein said poly(arylene sulfide sulfone) comprises poly(phenylene sulfide sulfone).

32. A process in accordance with claim 31 wherein after step (a), said first slurry is heated to a temperature ranging from about 185° C. to about 205° C.

33. A process in accordance with claim 32 wherein after step (a), said first slurry is heated to a temperature ranging from about 185° C. to about 190° C.

34. A process in accordance with claim 1 wherein during step (d), said washed, particulate arylene sulfide polymer is recovered from said second slurry by a process selected from the group consisting of filtration, screening, centrifuging, decantation and mixtures thereof.

35. A process in accordance with claim 1 wherein after step (d), said recovered, washed particulate arylene sulfide polymer is dried.

36. A process in accordance with claim 35 wherein after step (d), said recovered, washed particulate arylene sulfide polymer is cured.

* * * * *